April 10, 1951
E. F. MILLER
2,547,959
CENTRIFUGAL FUEL FEEDING SYSTEM FOR
ANNULAR COMBUSTION CHAMBERS
Filed Jan. 27, 1948
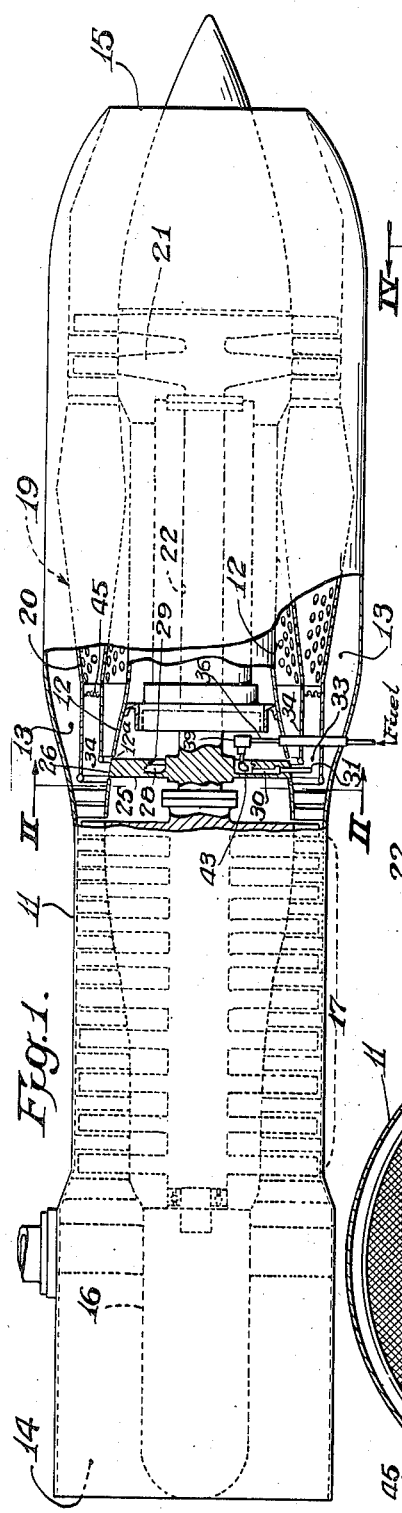
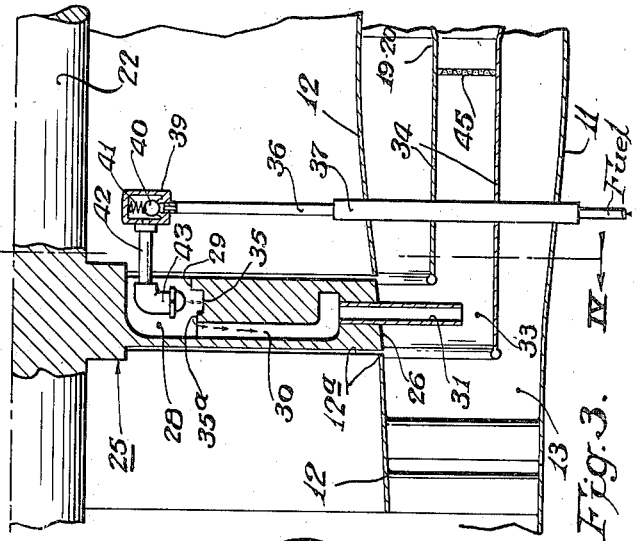
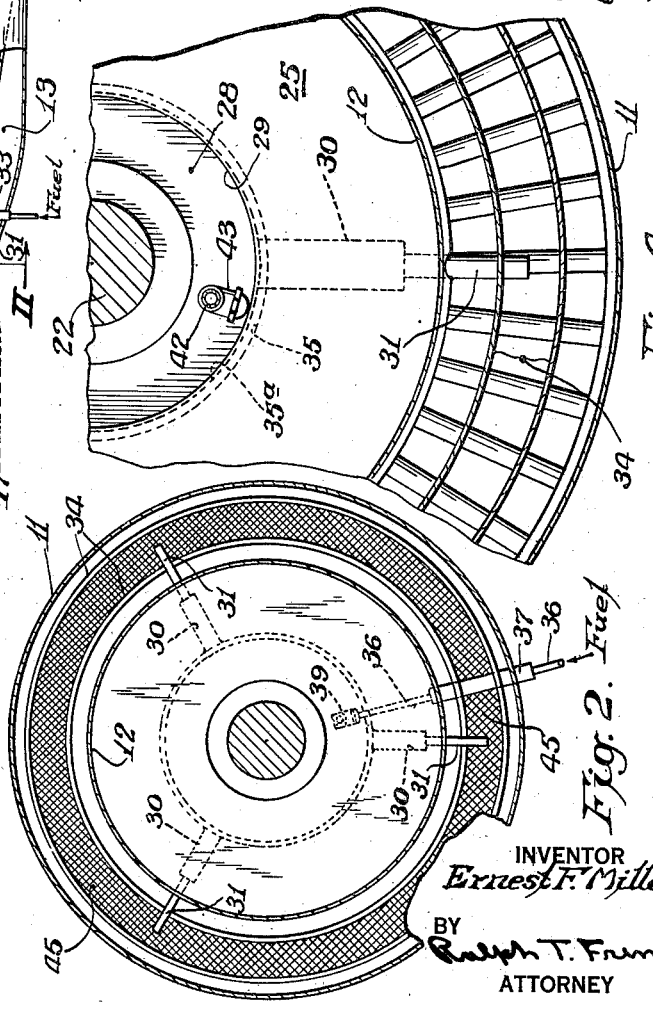
INVENTOR
*Ernest F. Miller*
BY
*Ralph T. French*
ATTORNEY Patented Apr. 10, 1951

2,547,959

UNITED STATES PATENT OFFICE 2,547,959

CENTRIFUGAL FUEL FEEDING SYSTEM FOR ANNULAR COMBUSTION CHAMBERS

Ernest F. Miller, Lansdowne, Pa., assignor to Westinghouse Electric Corporation, East Pittsburgh, Pa., a corporation of Pennsylvania Application January 27, 1948, Serial No. 4,590

4 Claims. (Cl. 60—41)

This invention relates to fuel combustion apparatus and has for an object the provision of improved means for supplying and distributing fuel to the combustion chamber of an aircraft engine.

In a conventional aviation gas turbine engine of the type comprising a cylindrical casing housing an axial flow compressor, fuel combustion apparatus, a turbine for driving the compressor, and a discharge nozzle, liquid fuel in atomized form is usually injected into the combustion chamber by way of a stationary manifold and nozzles. With this type of fuel supply system, a high pressure pump, auxiliary controls, and dump valve device are generally employed as parts of the equipment.

It is herein proposed to utilize the high rotational speed of the compressor drive shaft which may revolve at a speed of 12,000 R. P. M. for example, as a means for effecting distribution of fuel under pressure in the combustion chamber by centrifugal force without requirement of a fuel pump designed to pump against a high pressure. The invention accordingly has for another object the provision of a rotating ducted impeller element carried on the shaft in advance of the combustion chamber, by means of which fuel that is fed to a central cavity of the impeller can be discharged therefrom at high centrifugal pressure through suitable ducts and atomized in a collecting chamber communicating with the usual combustion apparatus.

It is another object of the invention to provide an improved fuel distributing apparatus for a gas turbine engine including supply nozzle means, and a rotary fuel impeller or centrifuge adapted to receive fuel therefrom and operated by the usual turbine shaft to effect atomization of fuel in an annular combustion chamber.

A further object of the invention is the provision of an improved fuel supply and atomizing apparatus for a gas turbine power plant including a rotary impeller operative at high speed to inject fuel into the combustion chamber by centrifugal force, and constructed and arranged for avoiding premature combustion or fire hazard.

These and other objects are effected by the invention as will be apparent from the following description and claims taken in connection with the accompanying drawing, forming a part of this application, in which:

Fig. 1 is a schematic, elevational view, partly in section, of a gas turbine power plant equipped with fuel distributing means constructed in accordance with the invention;

Fig. 2 is a sectional view, in enlarged detail, taken substantially along the line II—II of Fig. 1;

Fig. 3 is a fragmentary sectional view, in enlarged detail, of a portion of the impeller disc and associated parts of the apparatus shown in Fig. 1; and Fig. 4 is a fragmentary sectional view taken substantially along the line IV—IV of Fig. 3.

Referring to Fig. 1 of the drawing, the gas turbine engine therein illustrated in diagrammatic form is one of a type adapted to be equipped with a preferred form of the improved fuel distributing apparatus, and comprises a streamlined outer casing structure 11, which may be mounted in or on the fuselage of an aircraft and in which the operating elements of the engine are arranged in line to present minimum frontal area and drag during operation of the plane at high speed. Supported within the casing structure 11 is an inner casing structure 12 forming an annular passageway 13 which provides a flow communication extending longitudinally through the engine from a forwardly directed air intake opening 14 to a rearwardly disposed discharge nozzle 15. Mounted in the casing structure 11—12 along the axis thereof are a fairing section 16, which may contain auxiliary control apparatus (not shown), a multiple stage axial-flow compressor 17, fuel combustion apparatus 19 including an annular basket structure or shell 20, and a turbine 21. The rotor of the compressor 17 is adapted to be driven by the turbine 21 through the medium of an axially disposed shaft 22, which may be suitably journalled within the casing structure 12.

In accordance with well known principles of aviation gas turbine operation, air entering the intake opening 14 is compressed by the compressor 17 and supplied to the combustion apparatus 19—20, for supporting combustion of fuel therein while also protecting adjacent surfaces of the power plant from the resulting high temperatures. Hot motive fluid issuing from the combustion apparatus is then expanded through the turbine 21 and finally discharged through the nozzle 15 in the form of a jet establishing a propulsive thrust.

According to the invention, a novel means is employed for effecting distribution and atomization of fuel for combustion within the basket structure 20, comprising an impeller member or disc 25 which is keyed or otherwise secured to the shaft 22. In the apparatus chosen for illustration, the disc is disposed on the shaft 22 intermediate the compressor 17 and the combustion apparatus 20. The impeller member 25 has a diameter approximately equal to the diameter of the adjacent portion of the inner casing structure 12, which is provided with an annular opening 12a through which projects a peripheral portion 26 of the impeller member. It will be noted that the outer surface of the peripheral portion 26 is substantially flush with that of the inner casing structure 12. Formed in the impeller member 25 is an annular recess 28, which is open at one face of the impeller, preferably that on the downstream side thereof opposite the compressor 17. An annular lip 29 is formed on the impeller member at the mouth of this recess 28. The annular recess 28 communicates through one or more radially disposed passages or ducts 30 with corresponding impeller tubes 31, three such ducts and impeller tubes having been illustrated in Fig. 2 by way of example. Each of the impeller tubes 31 is adapted to extend outwardly into the open end or entryway 33 of an annular extension 34 carried by the basket structure 20 of the combustion apparatus 19, as best shown in Figs. 1 and 3. It will be noted that the outer annular wall of the extension 34 projects forwardly beyond the open end of each of the impeller tubes 31, and is thus adapted to receive fuel discharged therefrom during operation as hereinafter explained. Formed in the outer wall of the recess 28 of the impeller member is an annular well 35 bounded by an annular inner dam 35a, which is adapted to retain a predetermined quantity of fuel supplied in the manner hereinafter explained, in order to insure uniform distribution to the several ducts 30.

As is best shown in Fig. 3 of the drawing, fuel is supplied to the impeller 25 through the medium of a stationary supply conduit 36, which may be suitably supported in the casing structure of the power plant, as by means of a radially disposed heat-insulated strut 37 mounted in the outer and inner casing structures 11 and 12 and passing through the extension portion 34 of the combustion apparatus. The inner end of the fuel supply conduit 36 is disposed substantially in alignment with the annular recess 28 of the impeller member 25, and carries a valve casing 39 in which is mounted a ball check valve 40, which is urged toward seated position by a spring 41. Secured to the valve casing 39 is a branch pipe 42, the outer end of which carries a suitable nozzle 43 which is disposed within the annular recess 28 of the impeller member 25, and is adapted to discharge fuel outwardly through the several radial ducts 30.

In order to minimize the possibility of premature combustion, an annular flame arrestor grid 45 may be mounted within the extension 34 of the apparatus 19—20. This grid may be of any suitable construction and may comprise a foraminated element adapted to permit substantially unimpeded flow of atomized fluid in a downstream direction into the combustion chamber, while preventing any tendency of the flame to travel forwardly or in an upstream direction.

In operation, when the shaft 22 has been brought to a predetermined speed by operation of the usual starting device (not shown), fuel may be supplied under relatively low pressure to the conduit 36 from the usual fuel supply system with which the power plant is equipped, it being understood that the fuel pressure will be sufficient to force the ball check valve 40 from its seat to allow flow of fuel through the branch pipe 42 and nozzle 43. Liquid fuel thus injected into the annular recess 28 of the impeller 25 is at once picked up by the impeller and thrown outwardly through the several ducts 30 and impeller tubes 31. Since the rotational speed of the impeller 28 is very high, as already pointed out, the force with which the fuel is discharged from the impeller tubes 31 against the outer wall of the annular extension 34 of the combustion apparatus will be sufficient to effect atomization of the fuel into finely divided particles, which are then carried with the stream of compressed air flowing through the passageway 13 through the grid 45 and into the combustion chamber of the apparatus 19—20. It will be understood that suitable means for initially igniting the combustible mixture of fuel and air will be included with the combustion apparatus, although such ignition means is not illustrated in the drawing.

When it is desired to shut down the engine, the supply of fuel to the conduit 36 may be cut off, whereupon the spring 41 will seat the ball check valve 40 for preventing further flow to the pipe 42 and nozzle 43 of such fuel as may remain in the conduit 36. Since fuel in the ducts 30 and tubes 31 of the impeller 25 is quickly discharged therefrom and swept through the combustion apparatus 19—20, it will be apparent that risk of undesired residual combustion or other fire hazards is substantially eliminated, thus dispensing with the necessity for providing a fuel dump valve or other means for discharging fuel from the supply system.

While the invention has been shown in but one form, it will be obvious to those skilled in the art that it is not so limited, but is susceptible of various changes and modifications without departing from the spirit thereof.

What is claimed is:

1. Fuel combustion apparatus comprising a substantially cylindrical casing structure providing an annular air flow passage, combustion basket means supported in said passage and having an annular extension wall encompassing an entryway communicating therewith, a rotary shaft disposed axially within said casing structure, fuel supply means, and a centrifuge fuel impeller mounted on said shaft and having an inner annular recess and a plurality of radial ducts communicating therewith and disposed normal to said extension wall, said recess being adapted to receive fuel from said supply means, said ducts being adapted to throw fuel under centrifugal pressure against said extension wall of said basket structure for thereby effecting initial atomization and mixture of fuel with air flowing from said passage into said basket structure.

2. In combustion apparatus for a gas turbine power plant including cylindrical inner and outer casing structures forming an annular flow passageway, said inner casing structure having an annular opening formed therein, a rotary shaft mounted axially within said casing structure, an annular combustion chamber shell mounted in said passageway and having an annular extension wall formed adjacent an annular entryway, centrifuge impeller means carried by said shaft comprising a body having an annular fuel recess and a peripheral surface formed outwardly thereof, said peripheral surface being disposed substantially flush with said annular opening in the inner casing structure to minimize diversion of air from said passageway, a plurality of radial ducts in said body communicating with said recess and extending beyond said peripheral surface in normal alignment with said extension wall of the combustion chamber structure, and stationary means for supplying fuel to said recess, whereby fuel is impelled by centrifugal force through said radial ducts and impinged on said extension wall for atomizing and facilitating translation of fuel into said combustion chamber structure.

3. In a gas turbine power plant having an annular combustion chamber and an axially disposed rotor shaft, means for supplying atomized fuel to said combustion chamber comprising wall structure constructed and arranged for providing an annular fuel receiving surface adjacent an entryway for said combustion chamber, a rotary impeller disc carried on said shaft substantially in alignment with said entryway, said disc having an annular cavity communicating with a concentric opening formed in one side of the disc outwardly of the shaft, a plurality of radially disposed fuel discharge passages formed in said disc and communicating with said cavity, said discharge passages terminating in outlets for directing flow normal to said surface of the wall structure, a laterally disposed stationary fuel supply conduit mounted in said power plant, and a metering nozzle connected to said conduit and extending into said annular cavity in the disc, whereby fuel supplied through said conduit flows from said nozzle through said cavity and said radial passages and is sprayed under centrifugal force toward said surface of the wall structure adjacent said entryway.

4. In a gas turbine power plant having an annular compressed air flow passageway, an annular combustion chamber structure concentrically spaced therein, and an axially disposed rotor shaft, in combination, concentrically spaced inner and outer annular walls supported within said passageway and forming an upstream entryway for said combustion chamber structure, said outer wall overlapping the inner wall to provide an annular fuel receiving surface, a rotary fuel impeller carried on said shaft inwardly adjacent said entryway, said impeller having radially disposed discharge outlets substantially aligned with said fuel receiving surface and communicating with a lateral annular recess formed in said impeller outwardly of the shaft, and a stationary fuel supply nozzle mounted in said power plant and projecting into said annular recess of the impeller, said impeller being operative to subject fuel received from said nozzle to centrifugal force to effect spraying of fuel from said impeller discharge outlets against said fuel receiving surface in the path of compressed air flowing from said passageway through said entryway toward the combustion chamber structure.

ERNEST F. MILLER.

REFERENCES CITED

The following references are of record in the file of this patent:

UNITED STATES PATENTS

| Number | Name | Date |
| --- | --- | --- |
| 958,944 | Steward | May 24, 1910 |
| 1,104,222 | Rimmer | July 21, 1914 |
| 1,418,444 | Josephs | June 6, 1922 |
| 2,178,297 | Birkigt | Oct. 31, 1939 |
| 2,405,723 | Way | Aug. 13, 1946 |
| 2,409,176 | Allen | Oct. 15, 1946 |
| 2,416,389 | Heppner | Feb. 25, 1947 |